(12) United States Patent
Nishimura

(10) Patent No.: US 6,320,632 B1
(45) Date of Patent: Nov. 20, 2001

(54) COLOR REFLECTION TYPE POLARIZER

(75) Inventor: Suzushi Nishimura, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/343,739

(22) Filed: Jun. 30, 1999

(30) Foreign Application Priority Data

Jun. 30, 1998 (JP) .................................................. 10-183440

(51) Int. Cl.[7] .................................................. G02F 1/1335
(52) U.S. Cl. .............................. 349/97; 349/115; 349/98
(58) Field of Search .............................. 349/97, 98, 115, 349/113

(56) References Cited

U.S. PATENT DOCUMENTS

| 3,972,587 | * | 8/1976 | Scheffer ................................. 349/115 |
| 4,025,164 | * | 5/1977 | Doriguzzi et al. ................... 349/115 |
| 4,032,218 | * | 6/1977 | Scheffer et al. ..................... 349/115 |
| 4,239,349 | * | 12/1980 | Scheffer et al. ..................... 349/115 |
| 5,548,422 | * | 8/1996 | Conner et al. ........................ 349/73 |
| 5,808,713 | * | 9/1998 | Broer et al. ........................... 349/98 |

* cited by examiner

Primary Examiner—Toan Ton
(74) Attorney, Agent, or Firm—Scully, Scott, Murphy & Presser

(57) ABSTRACT

A color reflection type polarizer of a high quality and easy to manufacture is disclosed. The color reflection type polarizer is fabricated by disposing an optically anisotropic medium between a reflector and a polarizer, the optically anisotropic medium having a retardation in a plane thereof.

6 Claims, 5 Drawing Sheets

US 6,320,632 B1

COLOR REFLECTION TYPE POLARIZER

FIELD OF THE INVENTION

The present invention relates to a color reflection type polarizer and a liquid crystal display provided with said polarizer.

BACKGROUND OF THE INVENTION

Recently, the liquid crystal display has spread in quick tempo and at the same time has come to be used also in the fields requiring an excellent design such as the fields of game machines, watches and portable telephones. In these fields there is a gradually increasing demand for the colorization of a polarizer, but a colored polarizer capable of satisfying a required design is not available yet at present.

The polarizer generally adopted widely in liquid crystal displays utilizes a linear dichroism obtained by impregnating a plastic material such as a polyvinyl alcohol with iodine or a colorant and by subsequent stretching or the like, thereby allowing the iodine molecules or the colorant molecules to be oriented in a certain direction (see "How to use Cptical Parts and Points to be Noted," Optonics. Co., page 51, ISBN4-900474-03-7). In such a polarizer, a component of an incident light which component is parallel to the orienting direction of the molecules is absorbed. In colorization, therefore, a colorant molecule is needed which absorbs only the light of a desired zone selectively. Besides, a colorant molecule is required to exhibit a highly efficient linear dichroism and a high stability under high temperature and humidity. Thus, there arises the problem that the number of utilizable colorants is limited. In the manufacturing process, moreover, a process for the impregnation of colorant molecules is needed, thus giving rise to the problem that the impregnation process becomes complicated in order to produce different colors.

As one of methods for obtaining a colored polarizer in an optical manner without using such a colorant as mentioned above, there is known a method which utilizes the circular polarization selectivity of a cholesteric liquid crystal.

The cholesteric liquid crystal has a property of reflecting only the light of a specific wavelength selectively, and a colored polarizer which utilizes this property has also been proposed (see, for example, JP1-133003A).

However, the ordinary cholesteric liquid crystal involves the problem that it possesses the property of specular reflection and that therefore it is inferior in visibility. The method which utilizes a cholesteric liquid crystal is advantageous in that the color purity of reflected light is high, but involves a basic problem such that the mass production of a uniform cholesteric liquid crystal free of any defect or orientation disorder is difficult. Thus, it cannot be said that the method in question is a simple method.

OBJECTS OF THE INVENTION

It is an object of the present invention to solve the above-mentioned problems of the prior art.

Having made earnest studies about optical characteristics of optically anisotropic mediums, the present inventors succeeded in developing a novel and effective color reflection type polarizer.

It is widely known that in the interior of an optically anisotropic medium there occurs a phase difference between incident light and exit light because of different refractive indices depending on the direction of propagation (birefringence phenomena). If a linearly polarized light is introduced into such a medium, the light will usually emerge as an elliptically polarized light, but in the case where an intra-plane phase difference of an optically anisotropic medium is 90°, a linearly polarized light when introduced into the medium will be changed into a circularly polarized light, while a circularly polarized light when introduced into the medium will be changed into a linearly polarized light. If the phase difference of such a medium is 180°, the incidence of a circularly polarized light will result in output of a circularly polarized light whose rotational direction is inverted, although no influence is exerted on a linearly polarized light.

The phase difference which occurs in the optically anisotropic medium depends also on the wavelength of incident light. More specifically, even in the case where a phase difference of 90° occurs at a certain wavelength, the phase difference may not become 90° at another wavelength. The relation between wavelength and phase difference is determined by both retardation (birefringence×actual film thickness) of the optically anisotropic medium and birefringence wavelength dispersion.

By utilizing such optical properties of an optically anisotropic medium as mentioned above the present inventor has invented a color reflection type polarizing plate.

SUMMARY OF THE INVENTION

The present invention, in the first aspect thereof, relates to a color reflection type polarizer characterized in that at least one layer of an optically anisotropic medium having a retardation in a plane thereof is disposed between a reflector and a polarizer.

The present invention, in the second aspect thereof, relates to the above color reflection type polarizer, characterized by using an optically anisotropic medium having an intra-plane retardation in the range of 100 to 2,000 nm.

The present invention, in the third aspect thereof, relates to the above color reflection type polarizer, characterized by using an optically anisotropic medium having a birefringence value at 450 nm in the range of 0.8 to 1.3 times the birefringence value at 590 nm.

The present invention, in the fourth aspect thereof, relates to the above color reflection type polarizer, characterized in that a polarizer and an optically anisotropic medium are disposed so that a combination angle between an absorption axis of the polarizing plate and a slow axis of the optically anisotropic medium is within the range of 30° to 60°.

The present invention, in the fifth aspect thereof, relates to a liquid crystal display characterized by being provided with the color reflection type polarizer mentioned in the above first aspect.

DETAILED DESCRIPTION OF THE INVENTION

The present invention will be described in more detail hereinunder.

FIG. 1 illustrates constructions and principles of color reflection type polarizers according to the present invention, in which (A) shows that the amount of reflected light is minimized in the case of using as an optically anisotropic medium a quarter-wave plate exhibiting a phase difference of 90° for a certain wavelength, (B) shows that the amount of reflected light is maximized in the case of using a half-wave plate exhibiting a phase difference of 180° for a certain wavelength, and (C) shows that in the case of using a conventional phase plate as an optically anisotropic medium, the amount of reflected light is determined by a phase difference of the phase plate.

From the above it follows that in the color reflection type polarizer of the present invention, the amount of reflected light at a specific wavelength can be controlled by changing the retardation of an optically anisotropic medium used.

Thus, it can be said that by suitably selecting an optically anisotropic medium having appropriate retardation and birefringence wavelength dispersion it is made possible to change the spectral characteristics in the amount of reflected light. That is, according to the color reflection type polarizer of the present invention, a desired reflection color can be created by controlling the amount of reflected light between wavelengths.

An optically anisotropic medium to be used in the present invention is not specially limited insofar as it has retardation in a plane thereof, but an optically anisotropic medium which satisfies the following parameters will exhibit a more outstanding effect.

An intra-plane retardation of an optically anisotropic medium to be used in the invention is usually in the range of 100 to 2,000 nm, preferably 200 to 1,500 nm, more preferably 300 to 750 nm.

A birefringence value at 450 nm of the optically anisotropic medium is usually 0.8 to 1.4 times, preferably 0.9 to 1.3 times, more preferably 1.0 to 1.2 times, as large as its birefringence value at 590 nm.

For example, the optically anisotropic medium having the above-mentioned parameters can be obtained by using a low molecular, or monomer, liquid crystal ("liquid crystalline monomer" hereinafter) and/or a high molecular, or polymer, liquid crystal ("liquid crystalline polymer" hereinafter).

As to the use of a monomer liquid crystal, for example, there may be used as the optically anisotropic medium an isotropic transparent substrate cell filled with the monomer liquid crystal, a liquid crystal film formed by orienting a liquid crystal monomer having a photopolymerizable or thermopolymerizable functional group and by subsequent photo- or thermal reaction, or a liquid crystal-dispersed film containing monomer liquid crystal particles dispersed in a carrier.

The liquid crystalline monomer is not specially limited in its type and composition ratio. Those known in the field concerned are employable. Examples are calamitic (rod-like) liquid crystalline compounds known widely such as biphenyl derivatives, phenylbenzoate derivatives, and stilbene derivatives, as well as discotic (disc-like) liquid crystalline compounds such as triphenylene derivatives and truxene derivatives.

As to the liquid crystalline polymer, for example the following liquid crystalline polymer films are each employable as an optically anisotropic medium in the present invention: a liquid crystalline polymer film obtained by orienting a liquid crystalline polymer in the state of liquid crystal and by subsequent cooling to a temperature below the liquid crystal transition point of the polymer to fix the state of orientation, a photocrosslinked liquid crystalline polymer film obtained by orienting a liquid crystalline polymer having a photopolymerizable functional group and by subsequent photoreaction to fix the state of orientation, and a liquid crystalline film obtained by treating a composition of a liquid crystalline monomer and a liquid crystalline polymer in the same manner as above. The state of orientation which is fixed is not specially limited, but usually it is desirable that a nematic orientation or a twisted nematic orientation be fixed. Particularly when a twisted nematic orientation is fixed, an apparent birefringence wavelength dispersion can be changed by controlling the twist angle and thus the effect of the present invention can be exhibited more outstandingly.

The liquid crystalline polymer is not specially limited in its type and composition ratio. For example, the following liquid crystalline polymers known in the field concerned are employable: side chain type liquid crystalline polymers such as polyacrylates, polymethacrylates, polysiloxanes and polymalonates, and main chain type liquid crystalline polymers such as polyesters, polyester amides, polycarbonates, polyamides, and polyimides. Above all, liquid crystalline polyesters are preferred in view of their high transparency, easy handleability and excellent orientability.

The liquid crystalline monomers and polymers referred to above are not limited by their lyotropic or thermotropic properties, either, but in point of a film forming process it is desirable to use thermotropic ones.

A stretched polymer film is also employable as the optically anisotropic medium. As examples of the material of this film are mentioned polycarbonates, polyvinyl alcohols, polysulfones, polyethylenes, polypropylenes, polystyrenes, polyarylates, polyethylene terephthalates, triacetyl cellulose, diacetyl cellulose, and polyethylene-ethyl vinyl alcohols. But it is to be understood that no limitation is made thereto.

A film formed by using a mixture of the material of the stretched polymer film just referred to above and the liquid crystalline polymer and/or monomer is also employable suitably.

As a reflector used in the present invention, no special limitation is placed thereon. For example, there may be used a reflective plate usually employed in a reflection type liquid crystal display such as a reflective plate with a metal, e.g. aluminum or silver, vapor-deposited thereon, a dielectric multilayer film, or a mirror.

The polarizer which constitutes the color reflection type polarizer of the present invention is not specially limited, either. For example, there may be used an absorption type sheet polarizer, a reflecion type sheet polarizer, a pile-of-plate, and optical prisms such as Glan-Thompson prism and Glan-Foucault prism, with a sheet polarizer being particularly preferred in point of thickness and easy handling.

By disposing the optically anisotropic medium between the polarizer and the reflector in such a manner that a combination angle between an absorption axis of the polarizer and a phase-lag axis of the optically anisotropic medium is usually in the range of 30° to 60° in terms of an absolute value, the effect of the present invention can be exhibited in an outstanding manner.

EXAMPLES

Example 1

A 20% solution of a polyester type liquid crystalline polymer in chloroform was applied uniformly by a spin coating method onto a triacetyl cellulose film having a polyimide alignment layer which had been rubbed in a certain direction. After evaporation of the solvent, the thus-coated film was heat-treated in a clean air oven at 140° C. for 15 minutes. As a result, there was obtained a liquid crystalline polymer film (thickness: 2.42 $\mu$m) in which liquid crystal molecules were uniformly nematic-oriented in a direction parallel to the rubbing direction.

An intra-plane retardation of the above film was measured by means of an automatic birefringence system KOBRA-21ADH (a product of Ohji Keisoku Kiki Co.) and was found to be 530 nm. The birefringence value at a wavelength of 450 nm was about 1.13 times the birefringence value at a wavelength of 590 nm.

The liquid crystalline polymer film thus formed was sandwiched as an optically anisotropic medium in between a polarizer (POLARIZER 9118, a product of Sanritsu Co.) and a reflector with aluminum vapor-deposited thereon, through a pressure-sensitive adhesive, to afford a laminate. This laminate was then observed from the polarizer side and was found to be a color reflection type polarizer presenting green color. Then, using a spectrocolorimeter CM-3500d (a product of Minolta Co.), the said reflection type polarizer was measured for reflection spectrum. As a result, there was obtained such a spectrum as shown in FIG. 2. Color coordinates were (0.3056, 0.4331).

Example 2

Four stretched polycarbonate films each having an intra-plane retardation of 160 nm were laminated together so that the respective lag axes were parallel to one another. The resulting laminate was then measured for intra-plane retardation by means of an automatic birefringence system KOBRA-21ADH (a product of Ohji Keisoku Kiki Co.), which retardation was found to be 637 nm. The birefringence value at a wavelength of 450 nm was about 1.10 times the birefringence value at a wavelength of 590 nm.

The laminate of the above stretched films was sandwiched as an optically anisotropic medium in between a polarizer (POLARIZER 9118, a product of Sanritsu Co.) and a reflector with aluminum vapor-deposited thereon, through a pressure-sensitive adhesive. The resulting laminate was then observed from the polarizer side and was found to be a color reflection type polarizer presenting pink color. This reflection type polarizer was then measured for reflection spectrum by means of a spectrocolorimeter CM-3500d (a product of Minolta Co.). As a result, there was obtained such a spectrum as shown in FIG. 3. Color coordinates were (0.3584, 0.2769).

Example 3

The liquid crystalline polymer film used in Example 1 was sandwiched as an optically anisotropic medium in between a polarizer (POLARIZER 9118, a product of Sanritsu Co.) and a reflector with aluminum vapor-deposited thereon, through a pressure-sensitive adhesive, to afford a color reflection type polarizer. Using this color reflection type polarizer, there were observed changes of color based on a combination angle between an absorption axis of the polarizer and a phase-lag axis of the optically anisotropic medium.

As shown in FIG. 4, the combination angle is defined to be an acute angle between the absorption axis of the polarizer and the phase-lag axis of the optically anisotropic medium. It is assumed that when the slow axis of the optically anisotropic medium is present in the counterclockwise direction relative to the polarizer absorption axis, the combination angle is positive (+), while when the said phase-lag axis is present in the clockwise direction, the combination angle is negative (−)

While the combination angle was varied in the range of −90° to +90°, reflection spectra of the reflection type polarizer were measured by means of a spectrocolorimeter CM-3500d (a product of Minolta Co.) . The reflection spectra thus measured are shown in FIG. 5 and color coordinates are shown in Table 1. At combination angles of 0° and ±90° there was presented a color close to white color. The density of color varied with variation in the combination angle and it turned out that green color was the deepest at ±45°.

Thus, it was made sure that in the color reflection type polarizer of the present invention, by changing the combination angle between the polarizer absorption axis and the slow axis of the optically anisotropic medium, the density of color could be adjusted while keeping the hue intact.

As a combination angle range which permits adjustment of the color density at a certain value or more, a range of −30° to −60° or a range of +30° to +60° is preferred. This became clear from Example 3. Outside the above range, the developed color may be too light for a certain application, which would deteriorate the greatest feature of the color reflection type polarizer.

TABLE 1

| Combination Angle | xy Color Coordinates | Visible Color |
| --- | --- | --- |
| 0° | (0.3219, 0.3374) | nearly white |
| 15° | (0.3236, 0.3574) | very light green |
| 30° | (0.3292. 0.4198) | light green |
| 45° | (0.3338, 0.4719) | green |

Figure 1:
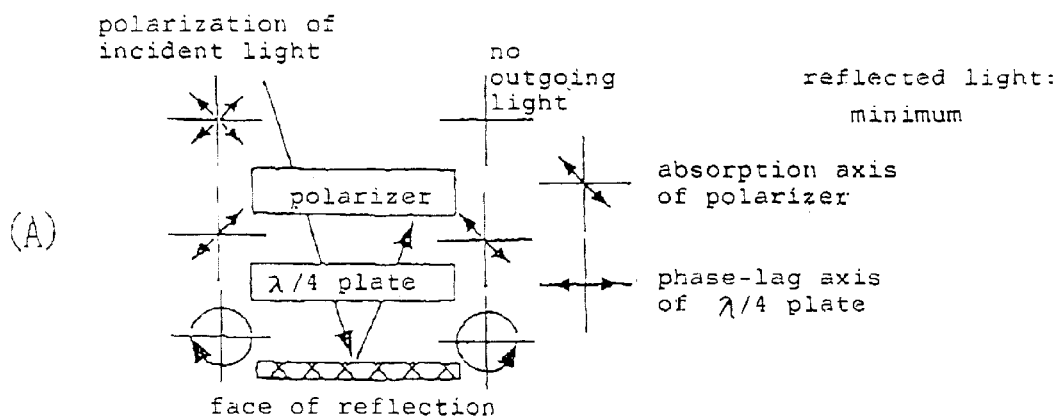
FIG. 1 illustrates constructions and principles of color relection type polarizers according to the present invention.
Figure 1:
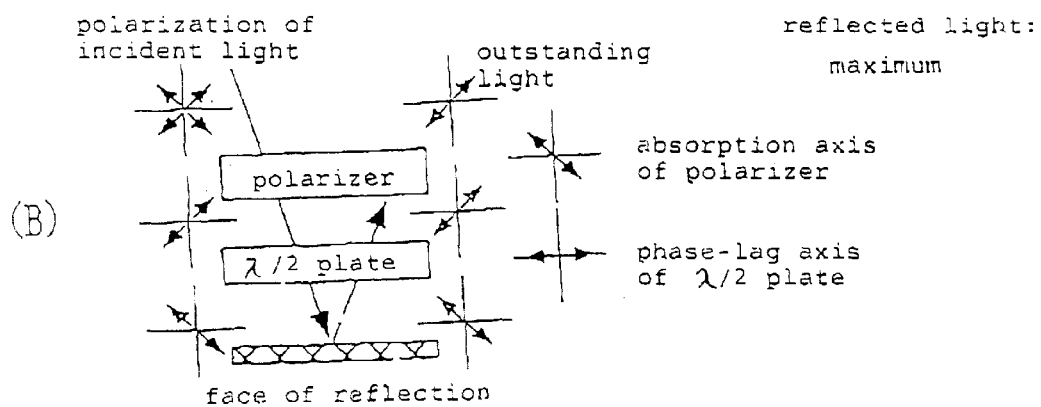
Figure 1:
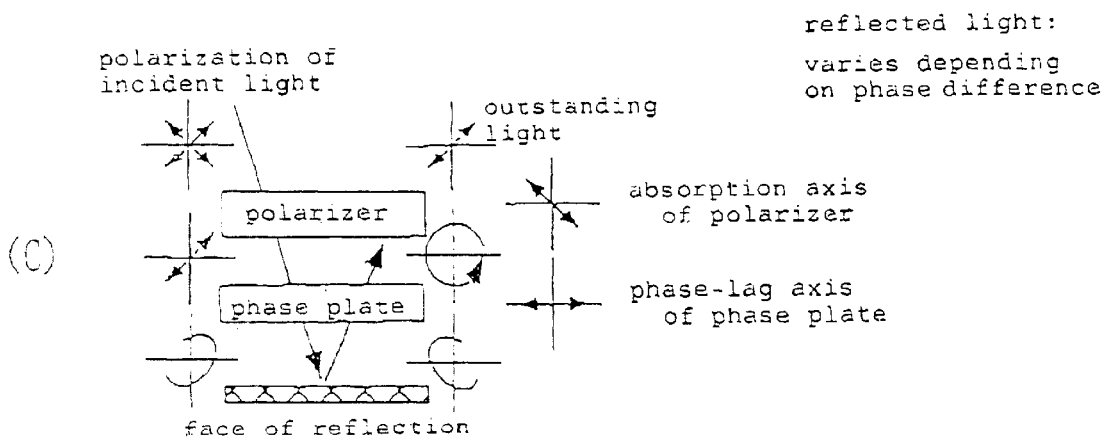
Figure 2:
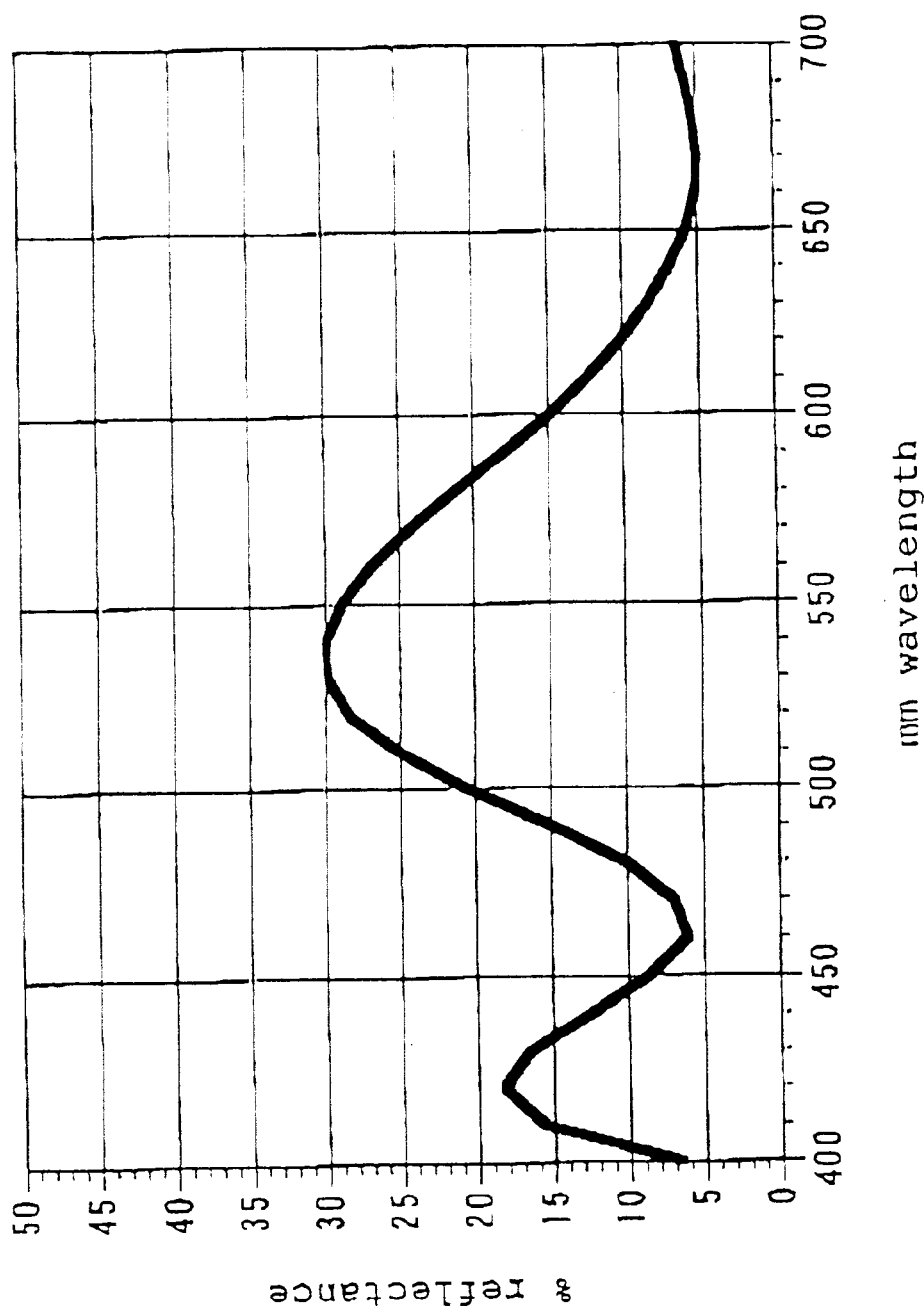
FIG. 2 illustrates a relection spectrum described in Example 1.
Figure 3:
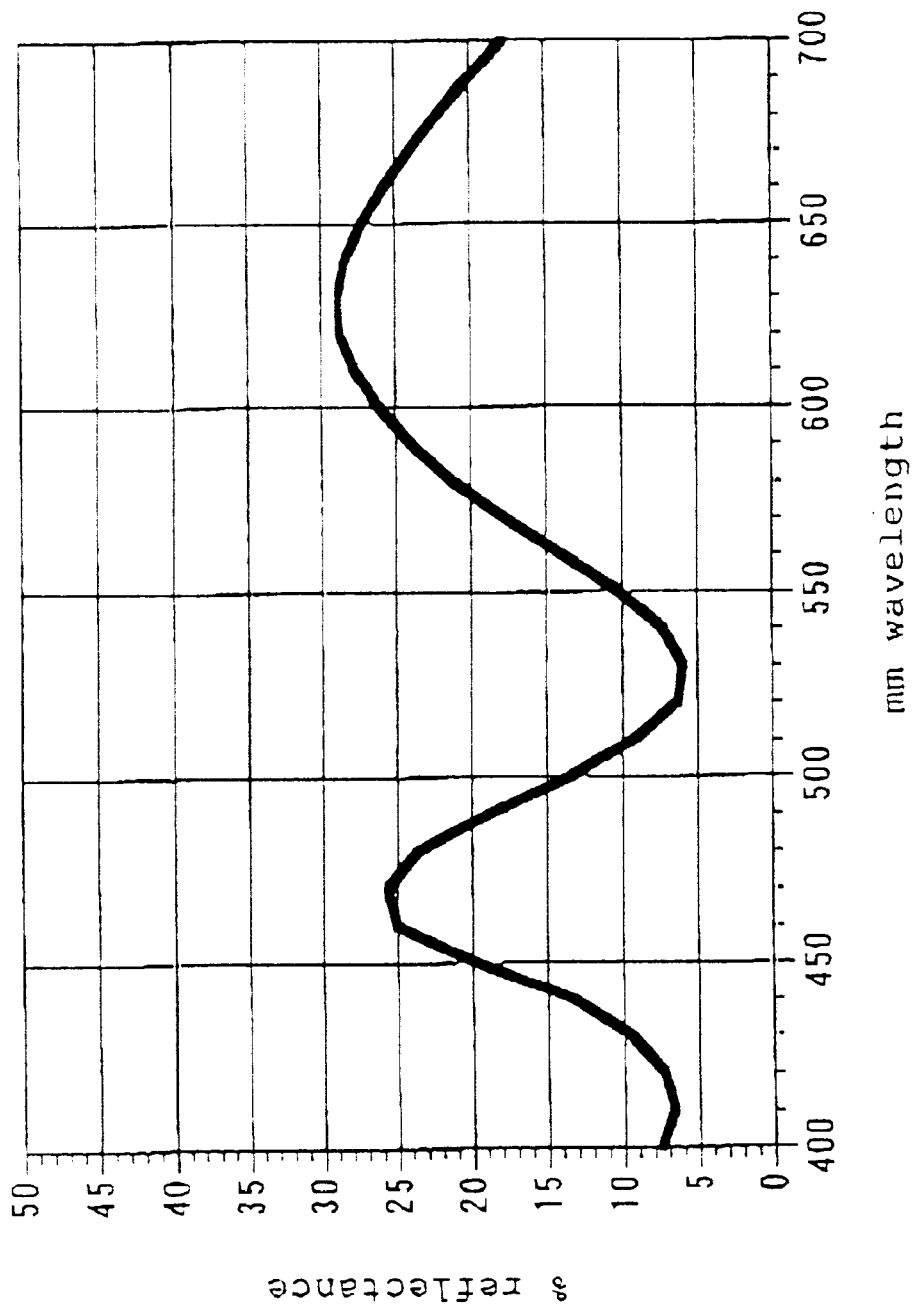
FIG. 3 illustrates a relection spectrum described in Example 2.
Figure 4:
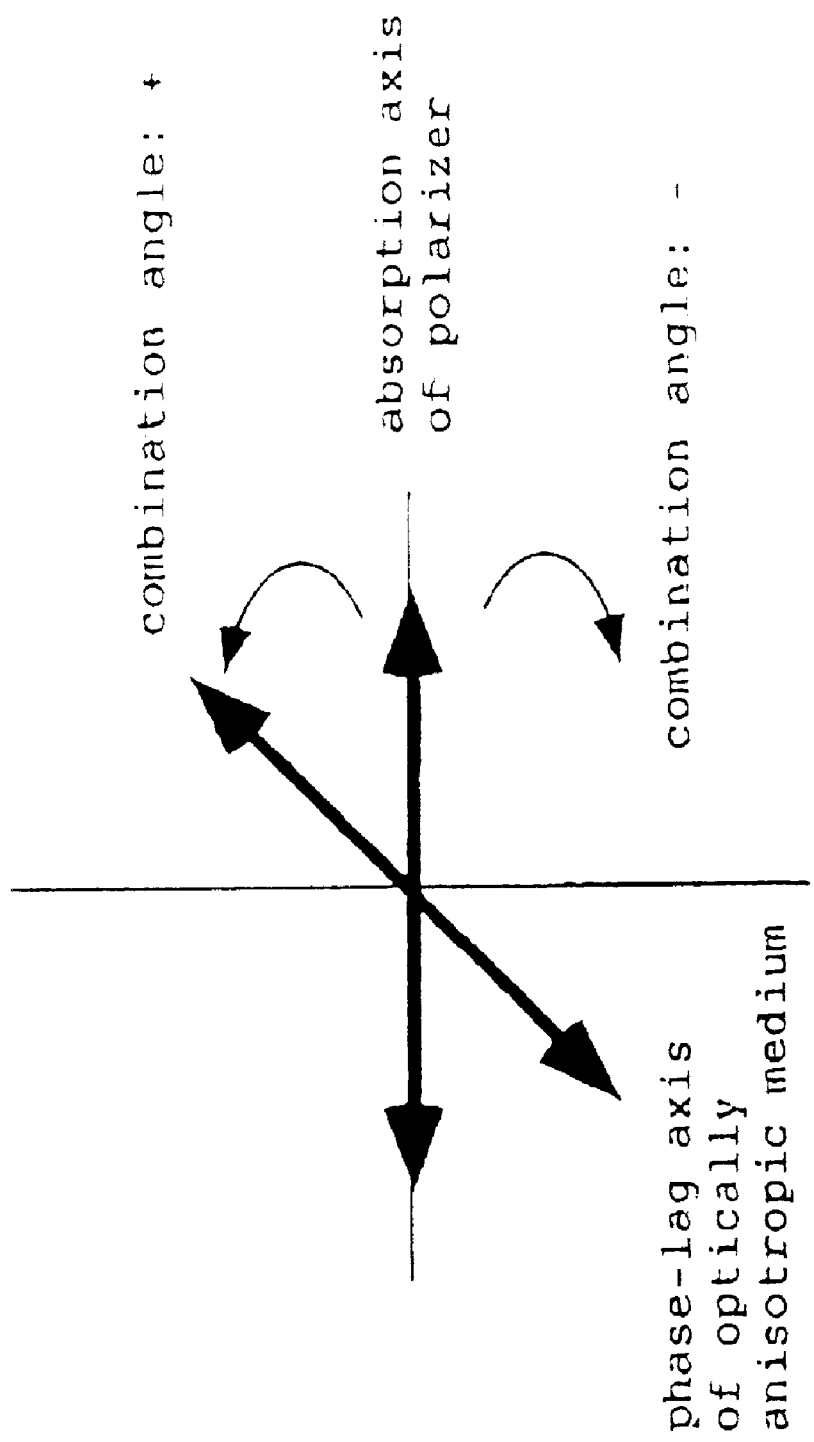
FIG. 4 is an explanatory diagram of a combination angle between a ploarizer and an optically anistropic medium.
Figure 5:
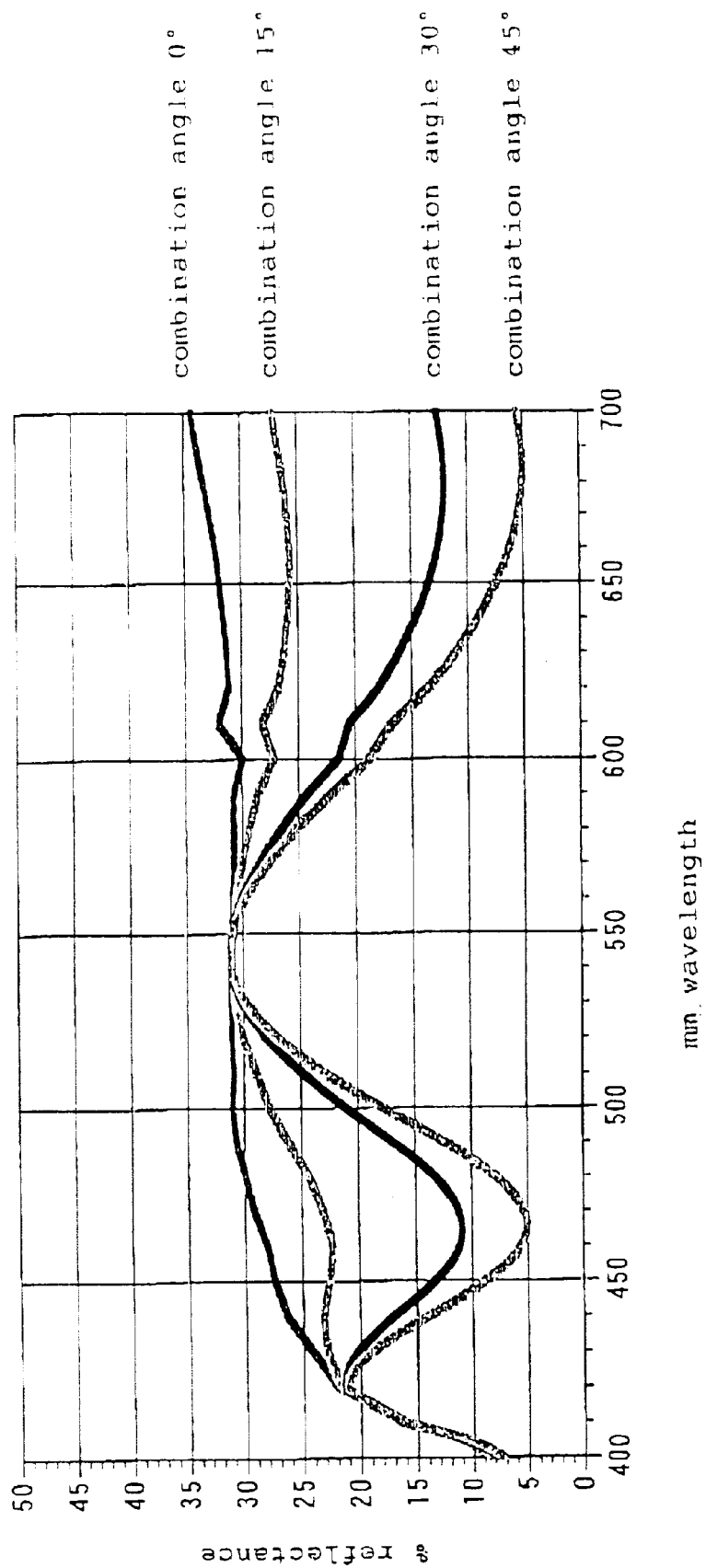
FIG. 5 illustrates a relection spectrum described in Example 3.

What is claimed is:

1. A color reflection type polarizer comprising at least one layer of an optically anisotropic medium having a retardation in a plane thereof disposed between a reflector and a polarizer, the value of birefringence at 450 nm of said optically anisotropic medium being in the range of 0.8 to 1.3 times the value of birefringence at 590 nm of the optically anisotropic medium.

2. A color reflection type polarizer according to claim 1 wherein said optically anisotropic medium is an optically anisotropic film.

3. A color reflection type polarizer according to claim 2 wherein said optically anisotropic film is selected from the group consisting of a liquid crystal film, a liquid crystal-dispersed film, a liquid crystalline film and a stretched polymer film.

4. A color reflection type polarizer according to claim 1 wherein said polarizer and said optically anisotropic medium are disposed so that a combination angle between an absorption axis of the polarizer and a slow axis of the optically anisotropic medium is in the range of 30 to 60 degrees.

5. A liquid crystal display including the color reflection type polarizer of claim 1.

6. A color reflection type polarizer according to claim 1 wherein the intra-plane retardation of said optically anisotropic medium is in the range of 100 to 2,000 nm.

* * * * *